(No Model.)
M. KOLBENSON.
ICE VELOCIPEDE.
No. 577,306. Patented Feb. 16, 1897.
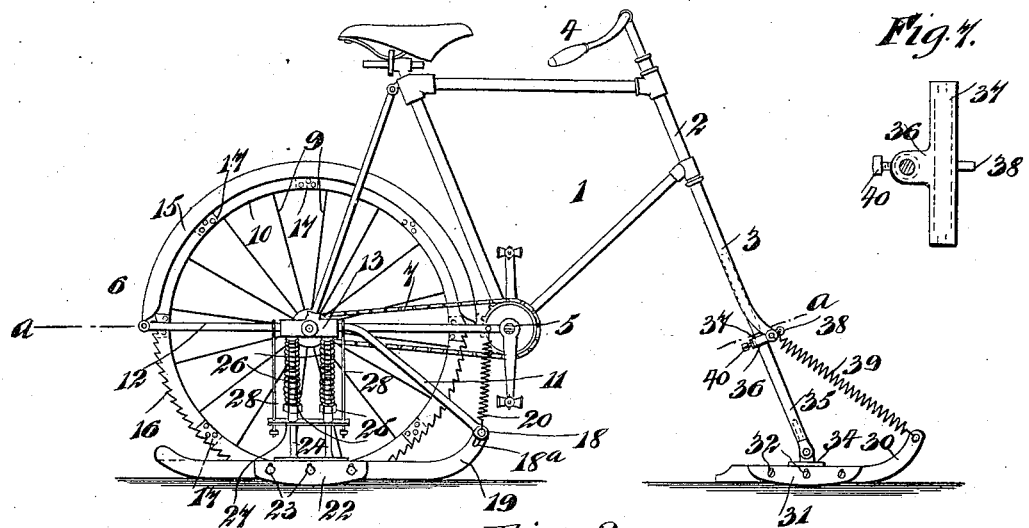
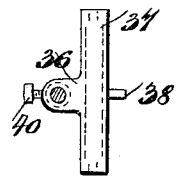
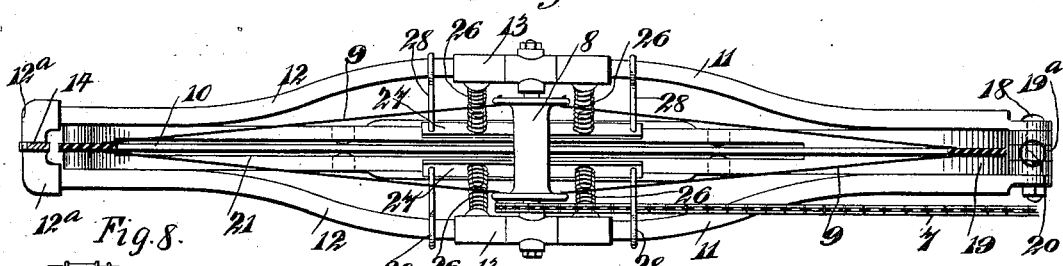
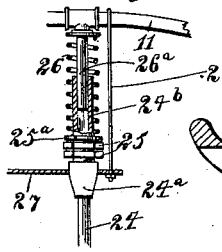
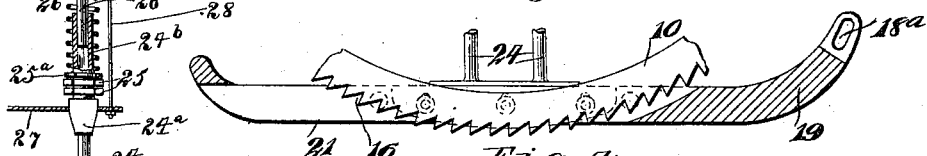
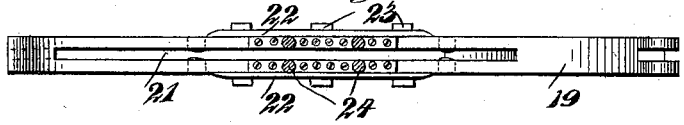
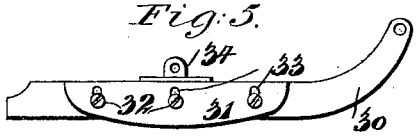
WITNESSES:
J. A. Rennie
J. S. Carlinger
INVENTOR
M. Kolbenson
BY
ATTORNEYS.
THE NORRIS PETERS CO., PHOTO-LITHO., WASHINGTON, D. C.

UNITED STATES PATENT OFFICE.

MATHIAS KOLBENSON, OF MARYSVILLE, MONTANA.

ICE-VELOCIPEDE.

SPECIFICATION forming part of Letters Patent No. 577,306, dated February 16, 1897.

Application filed April 22, 1896. Serial No. 588,606. (No model.)

*To all whom it may concern:*

Be it known that I, MATHIAS KOLBENSON, of Marysville, in the county of Lewis and Clarke and State of Montana, have invented a new and Improved Ice-Velocipede, of which the following is a full, clear, and exact description.

This invention relates to certain improvements in that class of vehicles commonly known as "ice-velocipedes," which are especially adapted for traveling over ice and snow, such devices being constructed on the principle of a bicycle and being provided with runners and with a driving-wheel operated by the feet of the rider and adapted to engage the surface over which the vehicle passes; and the object of the invention is to provide a device of this description of a simple and inexpensive character which shall be of a light and strong construction and will be provided with means whereby the driving-wheel may be placed into or out of operation in a convenient manner and at the will of the rider.

The invention consists in an ice-velocipede having a frame provided with means for adjustably holding the front runner or skate, a rear driving-wheel carried in the frame and provided with gearing whereby it may be operated from a pedal-crank, a rear runner or skate carried on the frame adjacent to the driving-wheel and provided with springs for pressing it normally downward, and means for regulating the tension of said springs so as to adjust the position of each skate relatively to the driving-wheel.

The invention also contemplates certain novel features of the construction, combination, and arrangement of the various parts of the improved ice-velocipede whereby certain important advantages are attained and the device is made simpler, cheaper, and otherwise better adapted and more convenient for use than various other similar devices heretofore employed, all as will be hereinafter fully set forth.

The novel features of the invention will be carefully defined in the claims.

Reference is to be had to the accompanying drawings, forming a part of this specification, in which similar characters of reference indicate corresponding parts in all the views.

Figure 1 is a side elevation of an ice-velocipede constructed in accordance with my invention. Fig. 2 is a sectional view drawn to an enlarged scale and taken horizontally through the rear driving-wheel on the frame of the device in the plane indicated by the line *a a*, Fig. 1. Fig. 3 is an enlarged fragmentary sectional view taken longitudinally and vertically through the rear runner of the device. Fig. 4 is a sectional plan view of said runner. Fig. 5 is a side elevation of the front runner detached and enlarged. Fig. 6 is a plan view of the same. Fig. 7 is a detached and enlarged detail view showing the bearing whereon the stem of the front runner is adjustably held, and Fig. 8 is a detached and enlarged sectional view showing the connection between the frame and rear runner.

In the views, 1 indicates the frame of the vehicle, herein shown as of the ordinary diamond pattern, being provided with a head-bearing 2, whereon is mounted to turn the steering-head, having its lower end forked, as shown at 3, and provided at its upper end with a handle-bar 4. In the lower part of the frame 1 is journaled the crank-shaft 5, having pedals at its opposite ends and provided with a sprocket-wheel over which passes a chain 7, the rear part of which gears with a sprocket-wheel on the hub 8 of the rear driving-wheel 6 of the device, said driving-wheel being formed of a flat circular rim 10, made up of sections riveted or otherwise secured together at their ends, which are made to overlap, as clearly indicated in Fig. 1, said rim being secured to the hub 8 by means of spokes 9, as clearly shown in Figs. 1 and 2.

The rear driving-wheel is held in the rear forks of the frame in the ordinary way and is inclosed within an auxiliary frame composed of side bars 12, extending rearwardly from the lower forks or stays of the frame, as shown in Figs. 1 and 2, the bars 12 being joined at their front ends by means of a coupling 13, of suitable construction, to the rear ends of the rear forks of the main frame and having secured to their rear ends brackets 12ª, extending toward each other and holding between them the lower flattened end 14 of a mud-guard 15, which extends around the upper part of the wheel-rim. The frame also comprises side bars 11, extending forward from the rear wheel, being bent down at their forward ends and pivotally connected, as indicated at 18, to the forward end of the rear runner 19, said runner being provided with a slot 18ᵃ to receive a bolt carried by the bars 11 and having its slotted portion forked to receive a block 19ᵃ, to which is connected the lower end of a spring 20, extending upward and connected at its upper end to the frame of the device.

At its central portion the rear runner 19 is provided with a longitudinal slot 21, extending through it and adapted to permit the passage of the rim 10 of the rear driving-wheel, said rim being provided with teeth or serrations 16, as shown in Fig. 3, and being constructed, as above stated, in a number of sections overlapped and riveted or otherwise secured together, as indicated at 17, and at opposite sides of the runner 19, preferably at points opposite the point of contact of the driving-wheel with the earth, are secured skates 22, having rounded under sides and formed of flattened metal plates having vertical slots formed in them to receive screws or bolts 23, whereby they are secured to the opposite sides of said runner.

At opposite sides of the central portion of the slot 21 in the runner 19 are secured the lower ends of vertical posts 24, which extend up on opposite sides of the wheel 6 and are screw-threaded at their upper ends to receive reducers 24ᵃ, in the upper enlarged ends of which screw tubes 24ᵇ, having lock-nuts 25, against which abut flanges 25ᵃ on the lower ends of the tubes 24ᵇ. Stout spiral springs 26 are coiled on the tubes 24ᵇ above the flanges 25ᵃ, the upper ends of which extend above the tops of said tubes and receive lugs 26ᵃ, projecting from the frame of the device on opposite sides of the axle whereon the driving-wheel 6 turns, and the lower ends of said lugs fit in the bores of the tubes 24ᵇ, as seen in Fig. 8.

To guide the parts and prevent the lugs 26ᵃ from being disengaged with the bores of the tube, I provide cross-bars 27, perforated for the passage of the posts 24 and reducers 24ᵃ and having their ends supported on vertical rods 28, secured to the bars 11 and 12 of the auxiliary frame of the rear wheel, as clearly shown in Figs. 1 and 2. By this arrangement it will be seen that lateral movement of the lugs 26ᵃ with respect to the posts 24 is prevented, and at the same time the frame is supported elastically above the runner.

The forward runner 30 is constructed very similarly to the rear runner 19, being provided with skates 31 at opposite sides, having slots 33 for the passage of adjusting-screws 32, whereby the skates may be arranged to project more or less below the under side of the runner, as will be readily understood, and said forward runner is provided at its central part with an upwardly-extended lug 34, to which is pivotally connected the lower end of a supporting-bar 35, having its upper end arranged to slide vertically in a socket 36, formed on a bearing-piece 37, perforated longitudinally, as indicated in dotted lines in Fig. 7, and adapted to receive the axle carried in the lower ends of the front forks 3 of the frame. The bearing-piece 37 is provided with a forwardly-extending lug 38, to which is connected the upper end of a spiral spring 39, the lower end of which is connected to the forward end of the runner 30, so that said runner, while free to move pivotally on the rod 35, is normally held with its front end raised. A set-screw 40 serves to secure the rod 35 adjustably in its socket 36.

From the above description it will be seen that the tension of the rear springs 26 may be readily adjusted by turning the nuts 25, so that the driving-wheel may be caused to bear with more or less pressure upon the ice and snow over which the device is passing, and at the same said springs, together with the forward spring 39, act to relieve the frame of the device and the rider from jolting and shocks resulting from the passage of the device over rough places.

It will also be seen that the skates 22 and 31 are capable of being adjusted so as to enter the ice to a greater or less degree, as may be desirable.

From the above description of my invention it will be seen that the device is of an extremely simple and inexpensive construction and is well adapted for the purposes for which it is intended, and it will also be seen that the invention is susceptible of some modification without material departure from its principles and spirit, and for this reason I do not wish to be understood as limiting myself to the precise form and arrangement of the parts herein set forth.

Having thus described my invention, I claim as new and desire to secure by Letters Patent—

1. In an ice-velocipede, the combination of a frame, front and rear runners thereon, the rear runner being provided with a longitudinal opening formed through it, and a driving-wheel having a rim constructed of flat metal sections overlapped at their ends and secured together, said rim being provided with teeth and being arranged to project through the opening in the rear skate, substantially as set forth.

2. In an ice-velocipede, the combination of a frame, a rear driving-wheel mounted to turn therein and provided with means to engage the ice, an auxiliary frame secured to the main frame, and consisting of bars extending forward on opposite sides of the driving-wheel, a runner having a vertical slot in its forward end, and connected by an adjustable bolt with the forward ends of said bars, and a spring connecting said bolt with the main frame, substantially as set forth.

3. In an ice-velocipede, the combination of a frame, a rear driving-wheel mounted to turn therein, an auxiliary frame comprising bars extending on opposite sides of the driving-wheel, a runner having an opening formed in it for the passage of the rim of the driving-wheel, said runner being pivotally connected to said bars at its forward end, posts extending up from the runner on opposite sides of the openings therein, nuts arranged to screw on the posts, and coil-springs held on the posts and bearing at their lower ends against said nuts, said springs having their upper ends connected to the frame, substantially as set forth.

4. In an ice-velocipede, the combination of a frame, a rear driving-wheel mounted to turn therein, an auxiliary frame comprising bars extending on opposite sides of the wheel, a runner having an opening for the passage of the wheel-rim and having its forward end pivotally connected to said bars, two posts extending up from the runner on each side of the opening therein, cross-bars carried on said posts, nuts arranged to screw on the posts, lugs depending from the frame and alined with the upper ends of the posts, springs held at their upper ends on said lugs and at their lower ends on the posts above the nuts thereon, and bars depending from the frame and arranged to support said cross-bars, substantially as set forth.

5. In an ice-velocipede, the combination of a frame having a driving-wheel, a steering-post having forks at its lower end, a bearing-piece secured at its ends to the forks and extending between the same, a rod carried by the bearing-piece, a forward runner loosely secured to the lower end of said rod, and a spring for holding said runner in position, substantially as set forth.

MATHIAS KOLBENSON.

Witnesses:
C. T. ROSCOE,
GEO. W. PADBURY.